United States Patent
Fiske et al.

(10) Patent No.: US 7,423,515 B1
(45) Date of Patent: Sep. 9, 2008

(54) FPALM II FINGERPRINT AUTHENTICATION LOCK MECHANISM II

(75) Inventors: Michael Fiske, San Francisco, CA (US); Jon Louis, Mountain View, CA (US)

(73) Assignee: Biogy Inc., San Francisco, CA (US)

( * ) Notice: Subject to any disclaimer, the term of this patent is extended or adjusted under 35 U.S.C. 154(b) by 483 days.

(21) Appl. No.: 10/889,237

(22) Filed: Jul. 11, 2004

Related U.S. Application Data (63) Continuation-in-part of application No. 10/778,503, filed on Feb. 15, 2004.

(60) Provisional application No. 60/488,611, filed on Jul. 18, 2003, provisional application No. 60/462,039, filed on Apr. 10, 2003.

(51) Int. Cl.
| | |
|---|---|
| G05B 19/00 | (2006.01) |
| G06F 7/00 | (2006.01) |
| H04B 1/00 | (2006.01) |
| H04L 9/14 | (2006.01) |
| H04Q 1/00 | (2006.01) |

(52) U.S. Cl. .................. 340/5.2; 340/5.7; 340/5.8; 70/416

(58) Field of Classification Search .......... 340/5.2, 340/5.7–5.8, 5.82–5.83; 70/416, 333, 280, 70/38, 63; 292/144, 341.16; 382/124
See application file for complete search history.

(56) References Cited

U.S. PATENT DOCUMENTS

| | | | | |
|---|---|---|---|---|
| 3,671,777 | A * | 6/1972 | Newell ..................... 327/169 |
| 3,742,739 | A * | 7/1973 | Hickman .................. 70/38 B |
| 4,587,516 | A | 5/1986 | Hiraki |
| 4,799,719 | A * | 1/1989 | Wood ........................ 292/144 |
| 5,061,923 | A * | 10/1991 | Miller et al. .............. 340/5.31 |
| 5,437,174 | A * | 8/1995 | Aydin ....................... 70/278.3 |
| 5,473,922 | A * | 12/1995 | Bair et al. .................... 70/416 |
| 5,517,184 | A * | 5/1996 | Miller et al. .............. 340/5.28 |
| 5,653,135 | A | 8/1997 | Miller et al. |
| 5,896,026 | A * | 4/1999 | Higgins ..................... 320/166 |
| 6,078,265 | A * | 6/2000 | Bonder et al. ............. 340/5.23 |

(Continued)

OTHER PUBLICATIONS

U.S. Appl. No. 10/778,503, filed Feb. 15, 2004, Fiske et al.

(Continued)

*Primary Examiner*—Brian Zimmerman
*Assistant Examiner*—Nam V Nguyen
(74) *Attorney, Agent, or Firm*—David Lewis (57) ABSTRACT

In an embodiment, a lock mechanism has a lock shaft, a motor, and a lock cylinder, wherein the motor rotates a cog that moves the lock cylinder into and out of the lock shaft. The lock cylinder is oriented concentric to an axis about which the lock cylinder rotates. Rotating the cog causes the lock cylinder to rotate about the axis, which in turn causes the lock cylinder to more into and out of the lock shaft in a direction along the axis. In an embodiment, the cog has no translational motion in a direction parallel to the axis. The lock cylinder may have grooves, and the cog may engage the grooves. Rotating the cog may causes the lock cylinder to rotate with the cog, and the cog to slide within the grooves as the lock cylinder moves along the axis.

16 Claims, 10 Drawing Sheets

Padlock Overview

U.S. PATENT DOCUMENTS

| | | | |
|---|---|---|---|
| 6,304,176 B1 | 10/2001 | Discenzo | |
| 6,401,501 B1 | 6/2002 | Kajuch et al. | |
| 6,462,444 B1 * | 10/2002 | Makkun | 310/75 A |
| 6,761,051 B1 * | 7/2004 | Tsai | 70/38 B |
| 6,766,040 B1 | 7/2004 | Catalano et al. | |
| 6,995,496 B1 * | 2/2006 | Hagood et al. | 310/317 |
| 7,043,060 B2 * | 5/2006 | Quintana | 382/124 |
| 7,113,070 B2 * | 9/2006 | Deng et al. | 340/5.2 |
| 2003/0152947 A1 | 8/2003 | Crossman et al. | |
| 2004/0164845 A1 | 8/2004 | Hwang | |
| 2004/0255623 A1 * | 12/2004 | Sun et al. | 70/38 A |
| 2008/0024272 A1 | 1/2008 | Fiske | |

OTHER PUBLICATIONS

U.S. Appl. No. 11/100,803, filed Apr. 6, 2005, Fiske.
U.S. Appl. No. 11/102,407, filed Apr. 7, 2005, Fiske.
U.S. Appl. No. 11/104,343, filed Apr. 11, 2005, Fiske.
U.S. Appl. No. 11/104,357, filed Apr. 12, 2005, Fiske.
U.S. Appl. No. 11/106,183, filed Apr. 13, 2005, Fiske.
U.S. Appl. No. 11/106,930, filed Apr. 14, 2005, Fiske.
U.S. Appl. No. 11/131,652, filed May 17, 2005, Fiske.
U.S. Appl. No. 11/134,123, filed May 20, 2005, Fiske.
U.S. Appl. No. 11/136,851, filed May 25, 2005, Fiske.
U.S. Appl. No. 11/137,886, filed May 25, 2005, Fiske.
U.S. Appl. No. 11/139,167, filed May 26, 2005, Fiske.
U.S. Appl. No. 11/140,810, filed May 31, 2005, Fiske.

* cited by examiner

FIG. 1

Lockshaft Current Generator

Lockshaft Casing

The casing is lined with a coil, which is a helix of wire that creates electricity when a magnet passes thru the coil.

Lockshaft

The lockshaft is magnetized material or contains a magnet.

FPALM II FINGERPRINT AUTHENTICATION LOCK MECHANISM II

CROSS-REFERENCE TO RELATED APPLICATIONS

This application claims priority benefit of U.S. Provisional Patent Application No. 60/488,611, filed Jul. 18, 2003. This application is also a continuation-in-part of U.S. patent application Ser. No. 10/778,503, filed Feb. 15, 2004, which claims priority benefit of U.S. Provisional Patent Application No. 60/462,039, filed Apr. 10, 2003.

FEDERALLY SPONSORED RESEARCH

Not applicable.

BACKGROUND

1. Field of Invention

The present invention relates generally to lock devices, particularly electronic lock devices. Presently, many different types of electronic locks are used to secure safes, vaults, doors, autos and motorcycles. U.S. Pat. Nos. 5,170,431 and 5,893,283 disclose locks having electromechanical locking systems. Some devices combine the electromechanical locking device with an electronic combination system, U.S. Pat. Nos. 5,451,934 5,488.350 and 5,488,660. Improvements on these lock devices have self-contained power generation systems, such as U.S. Pat. No. 5,870,914 and a power conservation system such as U.S. Pat. No. 5,896,026. Similarly, U.S. Pat. No. 5,617,082 uses an electronic lock device having a microprocessor, battery power, and a keypad input.

While U.S. Pat. No. 6,401,501 addresses many limitations with the previous electronic lock designs, it still requires an access code. U.S. Pat. No. 6,401,501 is technically still a traditional mechanical lock. The design in U.S. Pat. No. 6,401,501 still requires a person to either remember his or her access code or carry a key.

Up until FPALM, application No. 60/488,611, all mechanical locks required a key, a combination number, or an access code. FPALM II makes some implementation improvements to FPALM: in some products, a motor is preferable over a solenoid to open and close a lock because the motor costs less, and consumes less power. Further, FPALM II adds some additional ways of prolonging the power supply, when applied to portable products.

Overall, aside from FPALM, FPALM II is the first mechanical lock to replace a key, combination, or access code with a fingerprint sensor. FPALM II is also the first portable electronic lock capable of using a built-in self-sustaining power supply.

2. Advantages Over Prior Art

With FPALM II, a key, combination or access code is no longer necessary. There is no combination number, access code or key to steal. Further, there is no longer the problem of forgetting the combination number, the access code or losing the key.

A second advantage is that a traditional lock tumbler is no longer required. This greatly simplifies the lock mechanism, and can reduce the size and weight of the product.

A third advantage is that it is virtually impossible to forge someone's biometric attributes, such as a fingerprint, because every person has a unique genetic code. With traditional locking mechanisms, however, a locksmith or sophisticated thief is able to pick a lock relatively easily.

A fourth advantage is that if an unauthorized user attempts to break in, FPALM II can record the unauthorized fingerprint, enabling the user to identify and eventually apprehend the perpetrator. This record of the fingerprint also serves as a psychological deterrent to fraud or theft.

DETAILED DESCRIPTION OF THE INVENTION

Fingerprint Authentication Lock Mechanism II

The fingerprint authentication lock mechanism, FPALM II, is part of a device whose purpose is to control access to a level appropriate to its functionality. When built into a padlock, for example, FPALM II uses fingerprint identification and matching techniques to determine which individuals are authorized to unlock it. Overall, FPALM II is comprised of three basic components: 1) a fingerprint authentication system, 2) a power supply, and 3) a lock mechanism. These components are shown in FIG. 1, titled Hardware Diagram.

1. Fingerprint Authentication System

Figure 1:
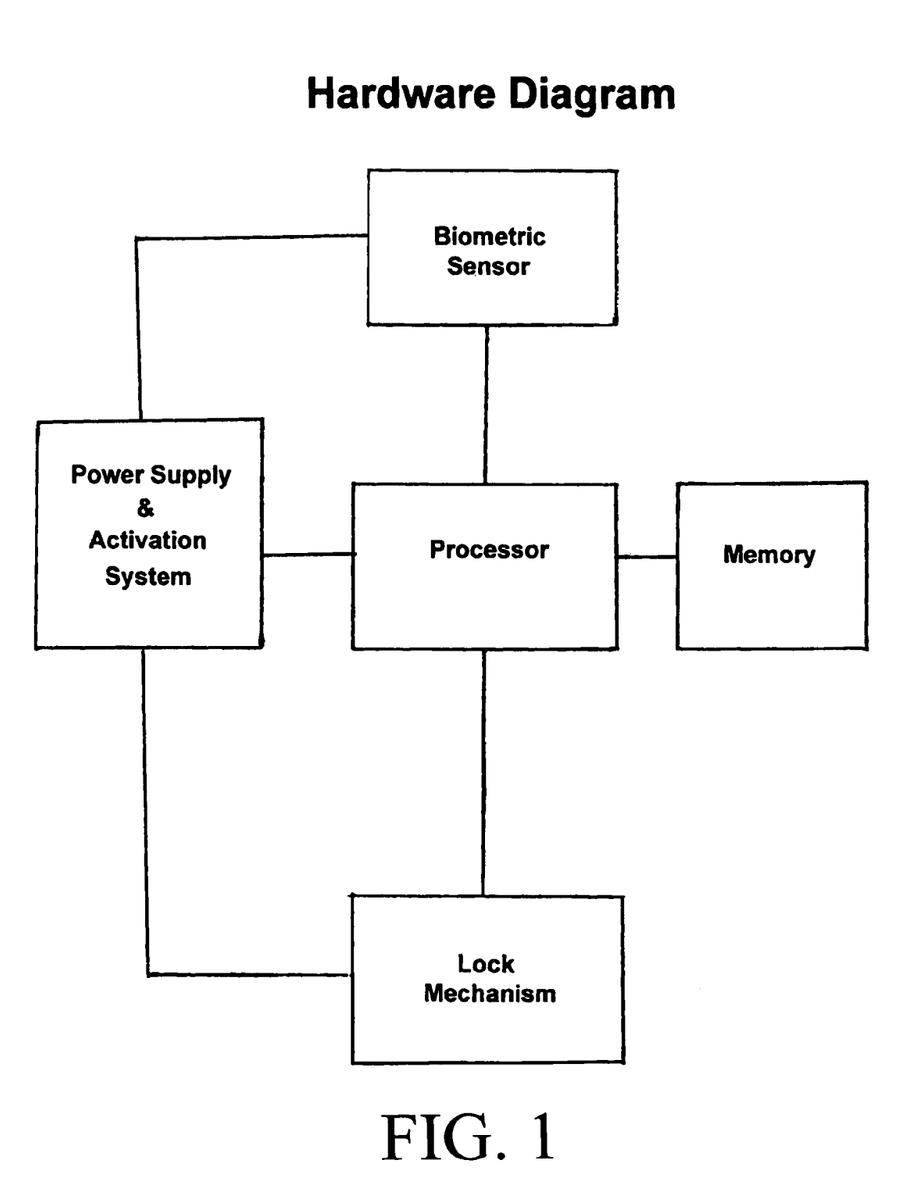
FIG. 1 is a block diagram of an embodiment of a lock mechanism having fingerprint authentication.

In FIG. 1, the fingerprint sensor, processor, and memory comprise the primary electronic hardware of FPALM II. The sensor, processor, and memory together may be integrated into a single chip, or their functions may be separated into two or more chips. The fingerprint sensor scans the fingerprint of a "lock administrator" and the fingerprint, or a representation of it, is stored in long-term memory while in "setup mode." Long-term memory allows the system to maintain a digital representation of the authorized user(s) fingerprint(s) even if the power supply shuts off, fails or is removed. Only the lock administrator, using his own fingerprint, may authorize the addition or removal of subsequent fingerprints to the database. Users who are added to the database by the lock administrator do not possess this capability. If necessary, the lock administrator may remove his own fingerprint(s) from the database and reassign the role of lock administrator to someone else who must then scan their fingerprint into the device during setup mode. The number of fingerprints that the lock administrator may add to the database is limited only by the amount of available memory. Thus, the database may consist of one fingerprint, or up to ten thousand fingerprints or more.

Once the database has been created during setup mode, subsequent finger scans can then be stored temporarily (active use mode) and compared against those in the database. The fingerprint need only be stored in temporary memory for as long as it takes to determine whether or not there is a match in the database. If the current fingerprint scanned matches one of those in the database, access is granted. In the case of the padlock, for example, the device will unlock. In other words, if there is a match, the software will send a signal to the mechanical components to open the lock mechanism. The lock mechanism is discussed in further detail in Section 4.

Another component of the Fingerprint Authentication System is the software. The software executes the functionality mentioned in the previous two paragraphs. In further detail, the software includes fingerprint minutia identification, template, and matching algorithms. The software may also include encryption algorithms for additional security.

Using mathematical measurements and invariants, the fingerprint minutia algorithm extracts many important, unique features from a user's fingerprint. The extracted minutiae enable the matching algorithms to uniquely distinguish this user from other users. In other words, the matching algorithm prevents an unauthorized user from gaining access while granting access to an authorized user. The unique, extracted minutiae and their locations within the fingerprint comprise a fingerprint template. The fingerprint template is stored in long-term memory.

Encryption of the templates is an optional higher level of security. The encryption algorithms encrypt and compress each fingerprint template before storing it in long-term memory. It is impossible to reconstruct the fingerprint image from a stored template. Thus, even if the digital data were somehow removed or extracted from the product, a potential thief or hacker would not be able to use the stolen fingerprint templates to break into someone's bank account, for example, or steal someone's identity through some other means external to the original product.

2. Power Supply

Figure 2:
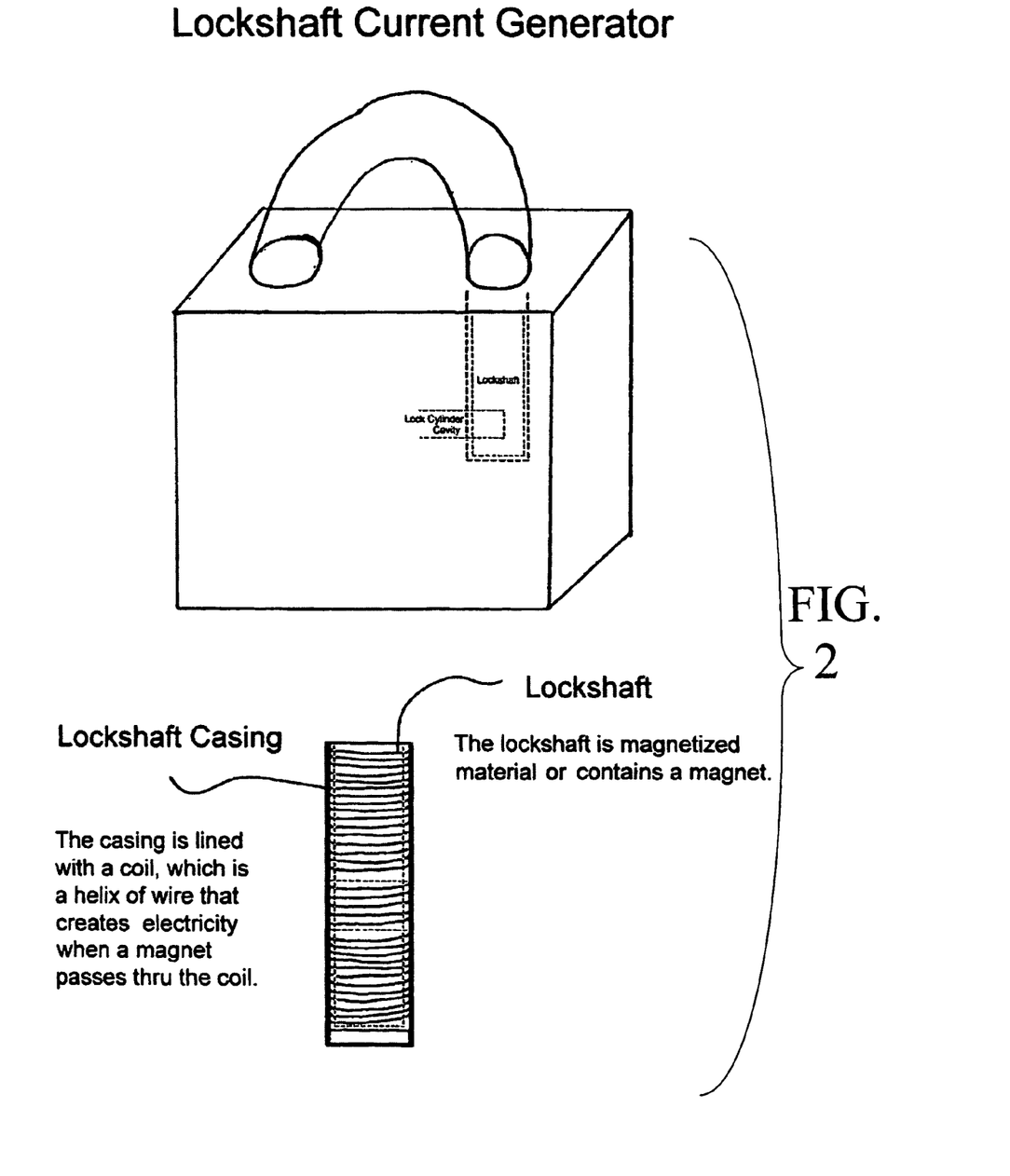
FIG. 2 is shows a representation of an embodiment of the current generator within lock mechanism.

The mechanism may incorporate any number of different power supply systems comprised of, but not limited to, direct current or AC current, disposable or rechargeable batteries, solar cells, fuel cells, and/or spring dynamos. We have four primary methods of substantially prolonging the life of the power supply, when the product is portable:

1.) Lock Shaft Current Generator. The mechanical motion of the lock shaft, pushes a coil of wire through a magnetic field, or vice versa, pushes a magnet through a coil of wire to generate electrical current to recharge the power supply. (Refer to FIG. 2, titled Lockshaft Current Generator.)

Figure 3:
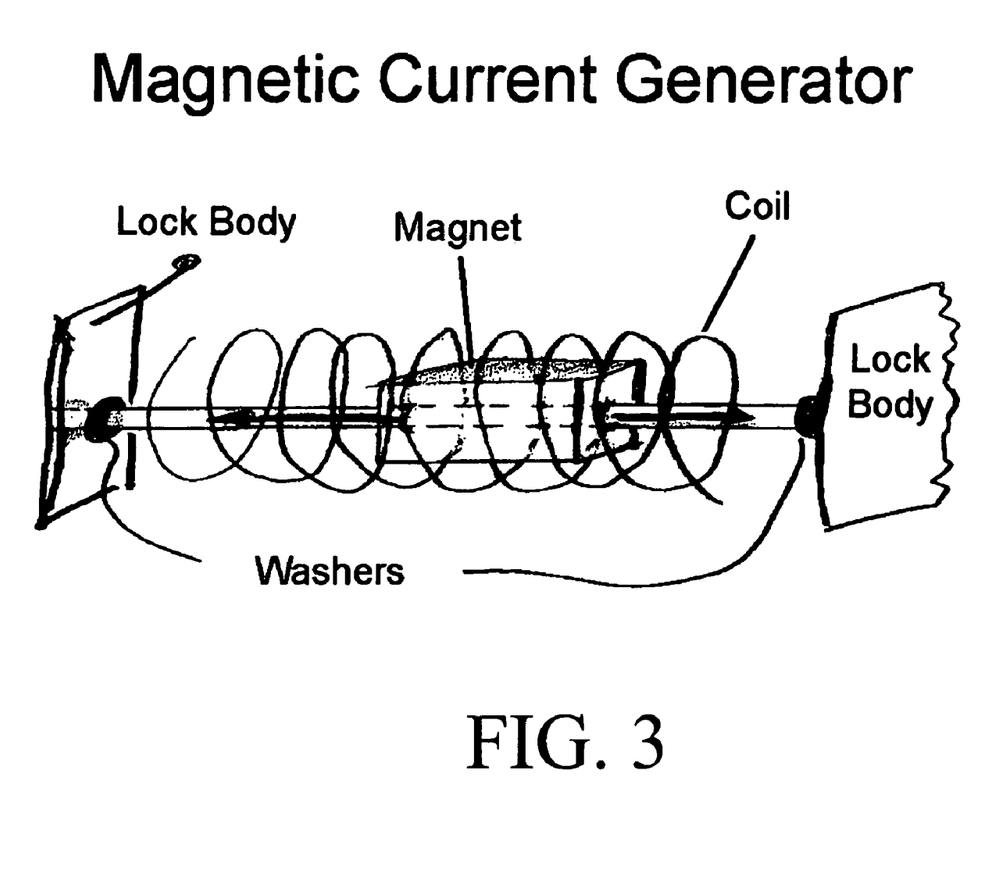
FIG. 3 shows a representation of an embodiment of the magnetic current generator of FIG. 2.

2.) Magnetic Current Generator. The kinetic energy obtained from the movement of the device itself is used to wind a spring, similar to a self-winding watch, or move a magnet through a coil of wire to generate electricity. (Refer to FIG. 3, titled Magnetic Current Generator.)

3.) User-Activated Current Generator. A third method recharges the power supply by means of a user-activated physical interface such as a button, dial, or lever. The preferable way to generate power is for the button, dial or lever to turn a motor.

4.) Activation System. A fourth method helps determine how to use power most efficiently, by means of an activation system. The mechanism may be activated automatically the moment a user touches the device, as some fingerprint sensors contain this capability. Alternatively, the system may be activated through traditional mechanical means, such as the operation of a button, lever, or other mechanical means operated by the individual. Once activated, enough power is supplied to the mechanism to scan the fingerprint, store the fingerprint template to the database, or store the fingerprint template temporarily to determine whether or not there is a match found in the database. In the padlock example, if a match exists, the lock will open. The entire process described above takes less than a few seconds. Thus, the mechanism need only maintain a certain power level long enough for the finger to be scanned, after which the mechanism immediately reverts back to standby or idle mode. Virtually zero power will be used when the device is not in active use.

3. Lock Mechanism

The lock mechanism is the electro-mechanical apparatus for opening and closing a lock. The lock mechanism, along with the processor and memory, is housed inside of a secure, tamperproof enclosure.

Figure 4:
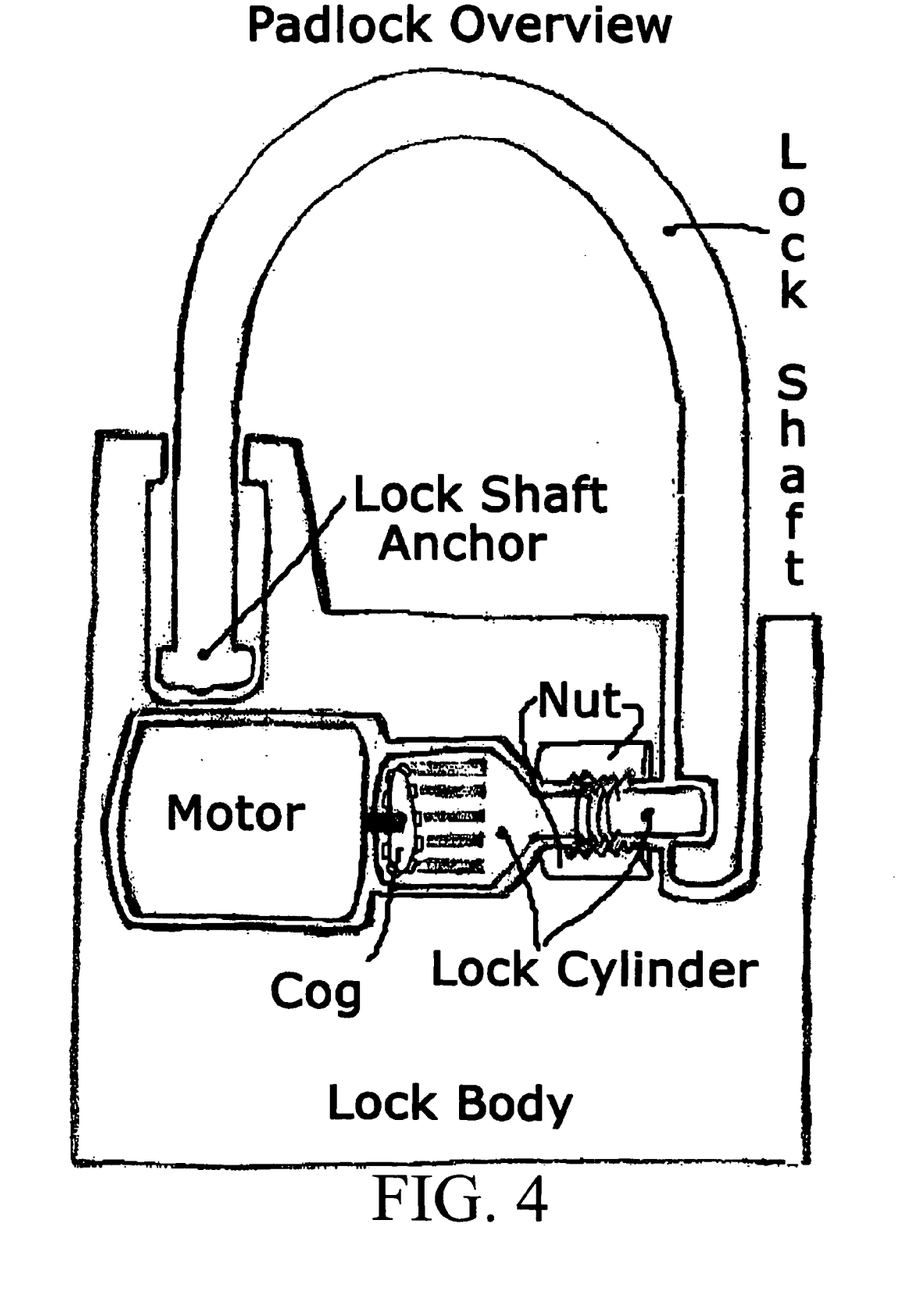
FIG. 4 shows a representation of the cross section of an embodiment of the lock mechanism.
Figure 5:
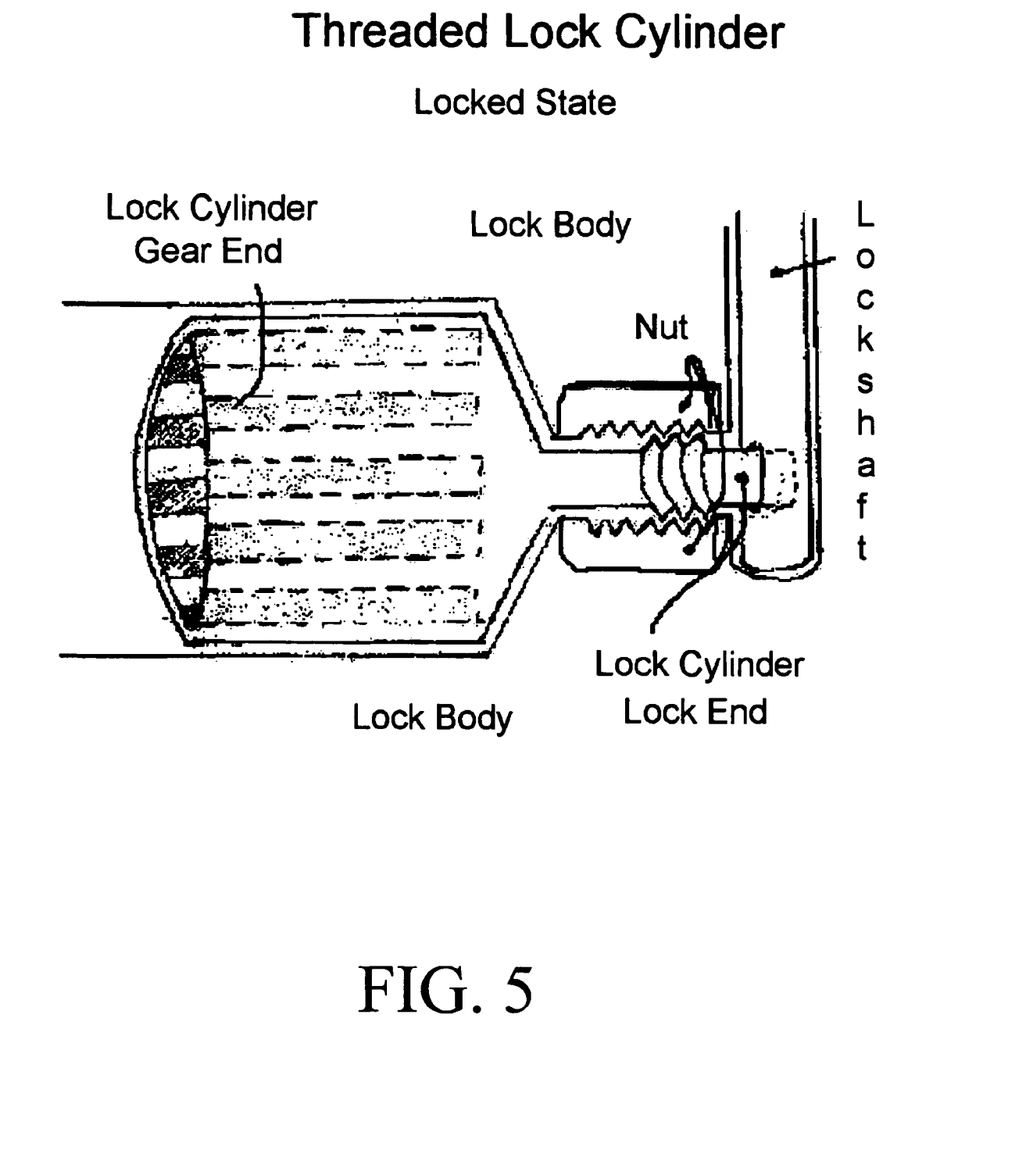
FIG. 5 shows a representation of an embodiment of the threaded lock cylinder within the lock mechanism in a locked state.
Figure 6:
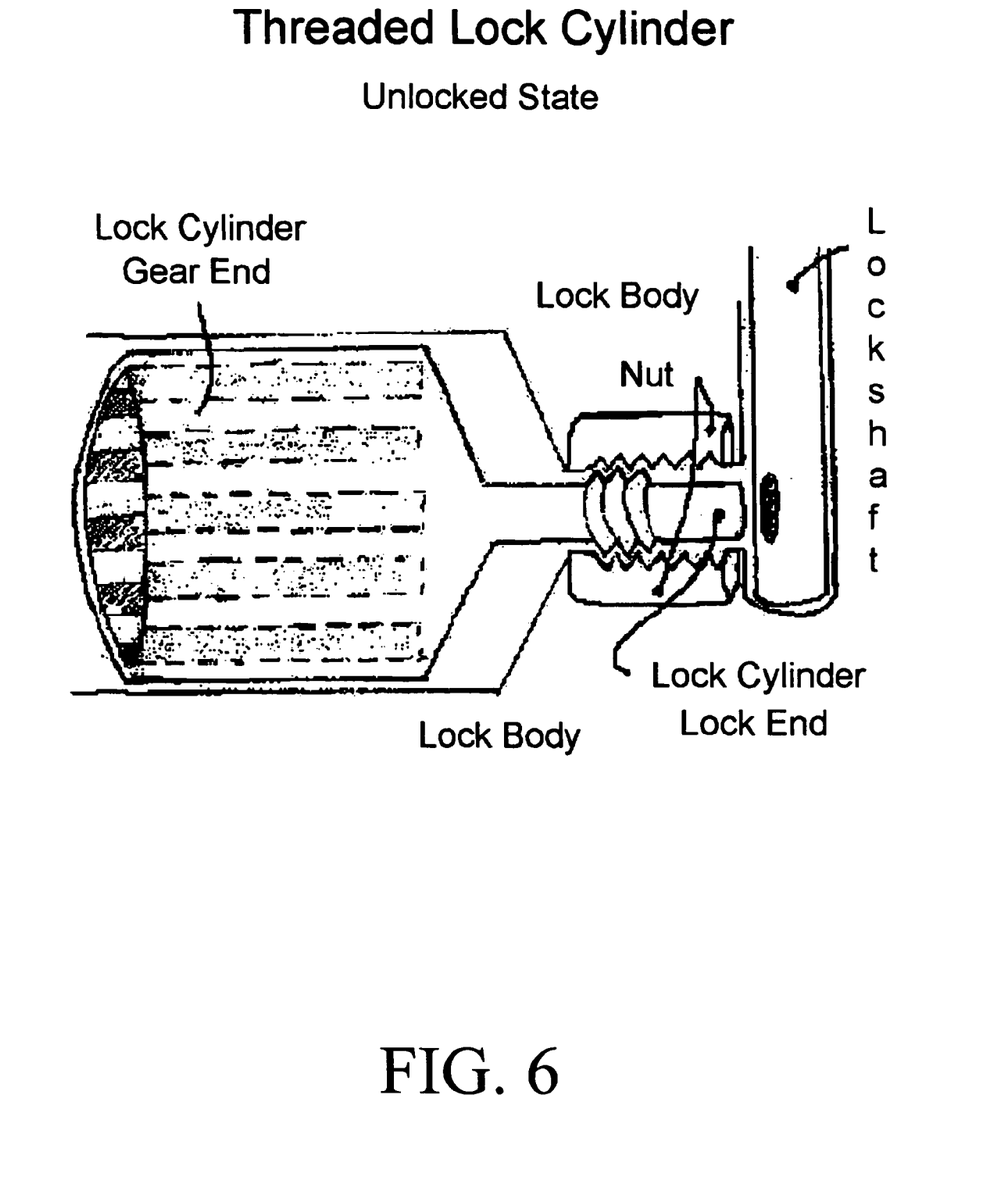
FIG. 6 shows a representation of an embodiment of the threaded lock cylinder within the lock mechanism in an unlocked state.
Figure 7:
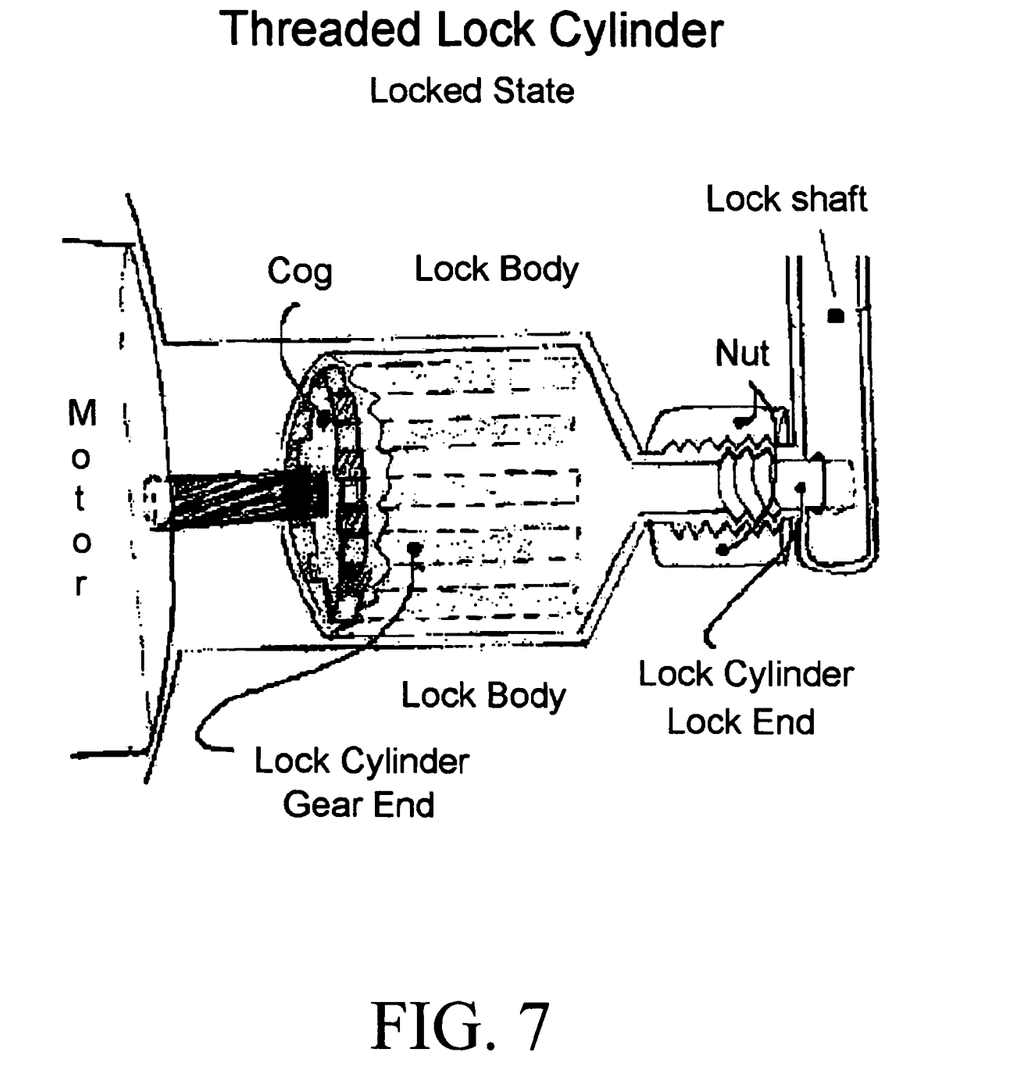
FIG. 7 shows a representation of an embodiment of the threaded lock cylinder with a cog within the lock mechanism in the locked state.
Figure 8:
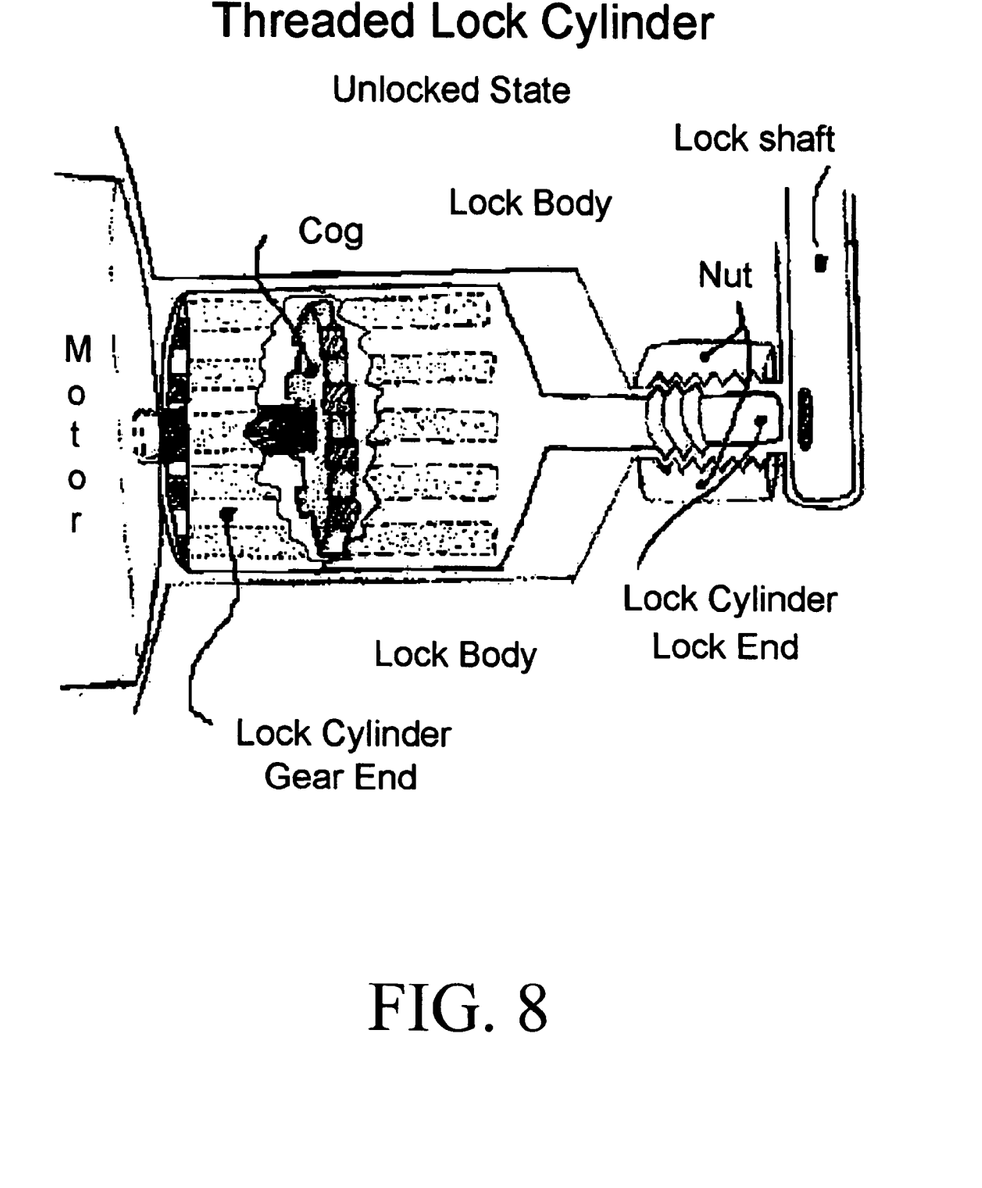
FIG. 8 shows a representation of an embodiment of the threaded lock cylinder with a cog within the lock mechanism in the unlocked state.
Figure 9:
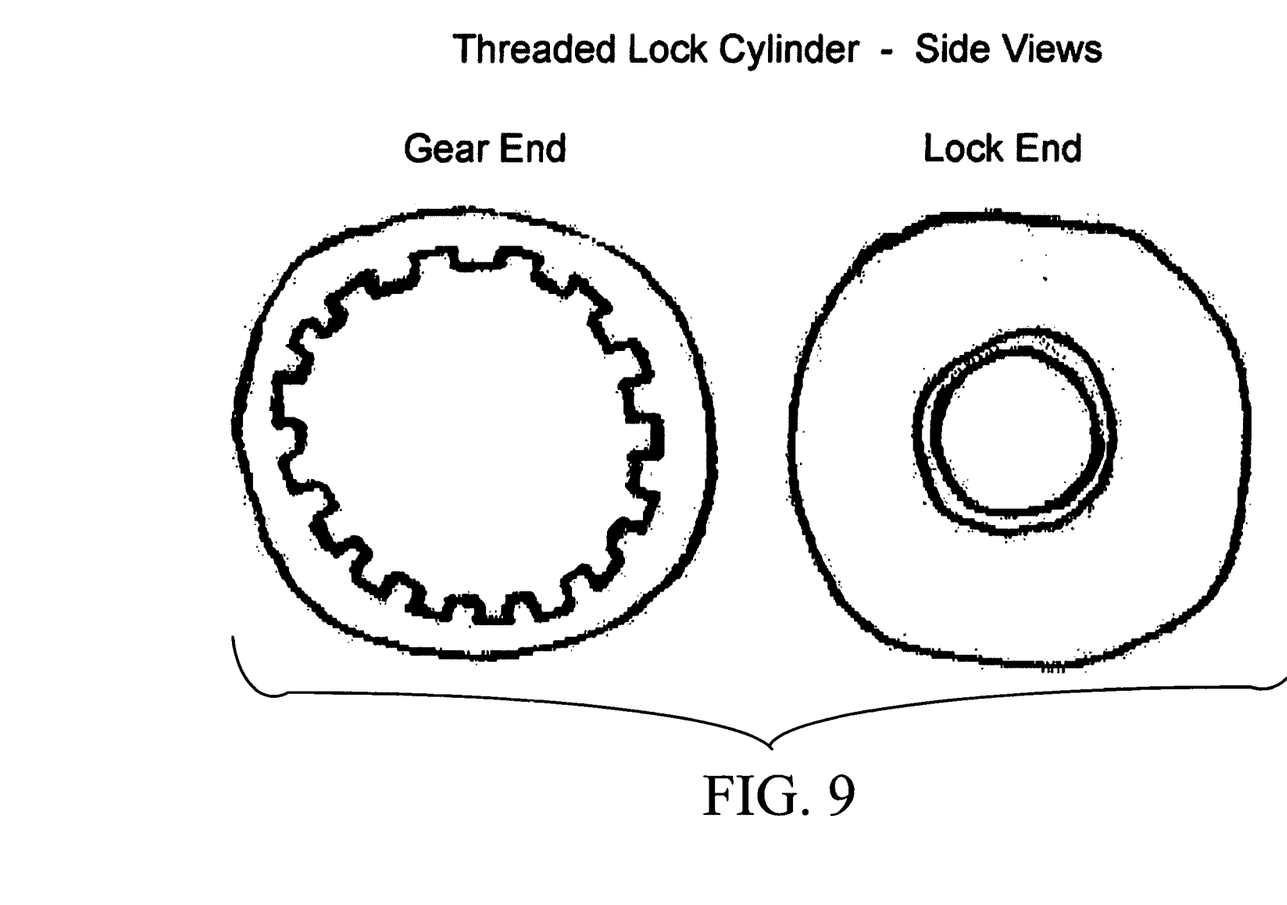
FIG. 9 shows a representation of the side views of an embodiment of the lock end and gear end of the threaded lock cylinder.

This lock mechanism may be applied to a wide variety of portable and non-portable lock products: auto locks, bike locks, door locks, gun and other weapon locks, luggage locks, purse locks, safe locks, school and gym lockers, ski locks, and padlocks. An implementation of this lock mechanism applied to the padlock is shown in the FIG. 4, titled Padlock Overview.

The electronic component of the lock mechanism is the motor. The motor controls two states: open and closed. The motor turns the lock cylinder, which is threaded, similar to the threads of a screw. By turning the lock cylinder, the lock cylinder protrudes into the cavity of the lock shaft to achieve a closed state, whereby the lock shaft is unable to move. Similarly, when the motor turns the lock shaft in the opposite direction, the lock cylinder retracts from the lock shaft cavity to achieve an open state, thereby enabling the user to open the device. (Refer to FIGS. 5, 6, 7, 8, and 9, titled Lock Cylinder locked state, Lock Cylinder unlocked state, Lock Cylinder and Gear locked, Lock Cylinder and Gear unlocked, and Lock Cylinder Side Views.)

Figure 10:
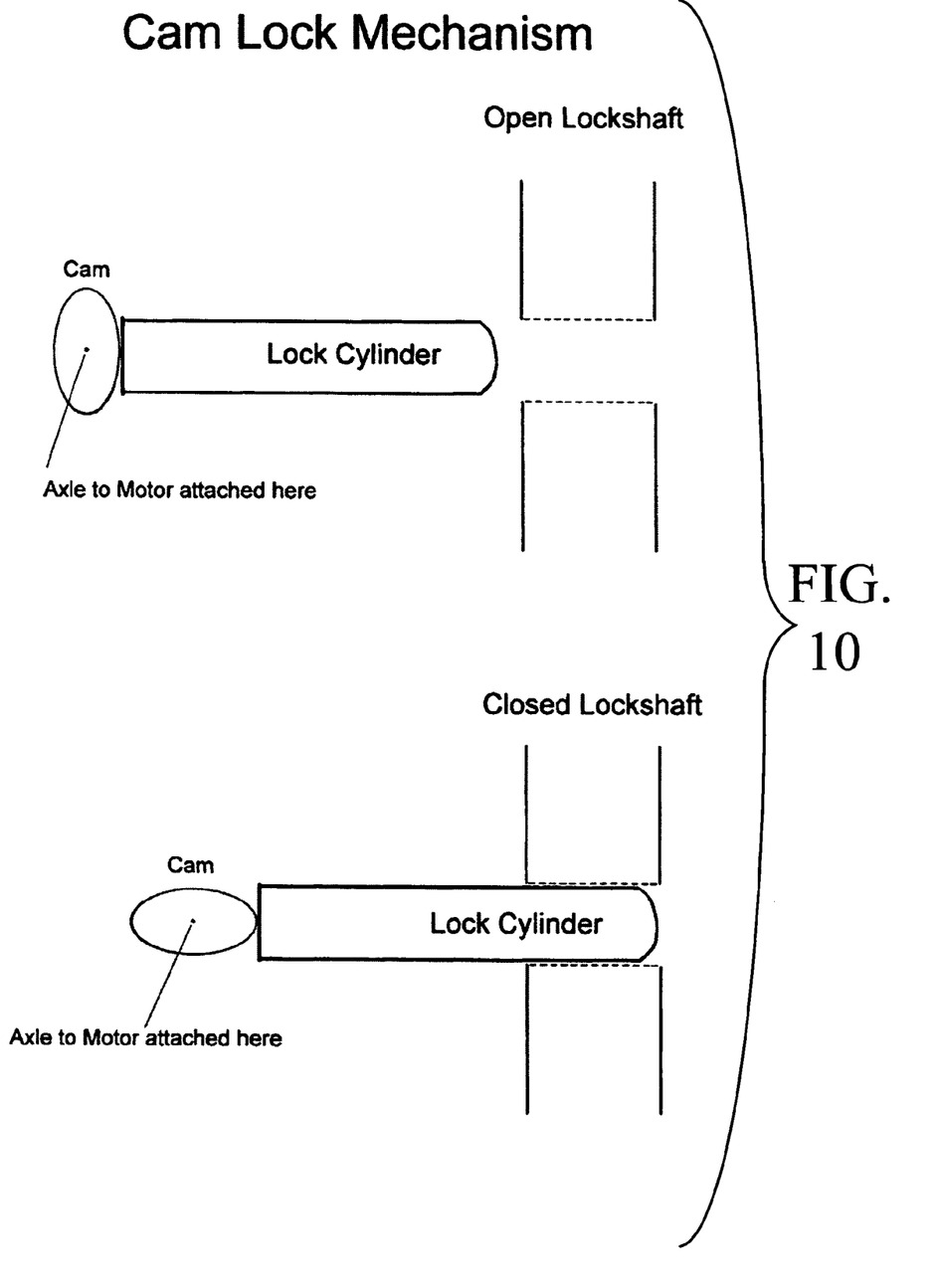
FIG. 10 shows a representation of an embodiment of the cam lock mechanism in the unlocked and locked states.

An alternative implementation of our lock mechanism is to use a cam. When the motor turns, it rotates a cam. When a lobe of the cam presses against the lock cylinder, the lock cylinder protrudes into the cavity of the lock shaft to achieve a locked state. When the narrower part of the cam presses against the lock cylinder, the lock is in an unlocked state. (Refer to FIG. 10.)

The following is a list of some possible applications of the lock mechanism described above.

The padlock example is the simplest product application of the FPALM II. Other examples include, but are not limited to, the following product categories:

1. General Purpose Security: Door Locks, Padlocks, Bike Locks, Steering Wheel Locks, Lockboxes, Home Safes
2. Law Enforcement & Civilian Defense: Handguns, Rifles, Pepper Spray Dispensers, Mace Dispensers, Stun Guns
3. Home Hazard Safety: Hazardous Power Tools, Stovetops, Prescription Jars, Medicine Cabinets, Tool Cabinets, Electrical Outlets
4. Travel: Luggage, Briefcases, Carry-On Bags
5. Office & Commercial: Desk Drawers, File Cabinets, Cash Registers
6. Rental Space: Post Office Box Rental, Locker Rental, Storage Garage Rental

We claim:

1. A lock mechanism, comprising:
   (A) a lock shaft,
   (B) a motor,
   (C) a lock cylinder, and
   (D) a power supply, wherein said motor rotates a cog to move said lock cylinder into and out of said lock shaft, the cog rotating about an axis, the lock cylinder being oriented concentric to the axis, and moving the lock cylinder into and out of the lock shaft is accomplished by moving the lock cylinder in a direction along the axis;
   the cog having no translational motion in a direction parallel to the axis,
   the lock cylinder having grooves, and
   the cog engaging the grooves, rotating the cog causes
      the lock cylinder to rotate with the cog, and
      the cog to slide within the grooves as the lock cylinder moves along the axis.

2. The lock mechanism in claim 1, further comprising a user interface to the power supply, wherein the user interface includes at least a dial, the dial causing a motor to turn and generate current.

3. The lock mechanism in claim 1, wherein said power supply includes at least a motor.

4. The lock mechanism in claim 1, wherein said power supply includes at least a battery.

5. The lock mechanism in claim 1, wherein said power supply is at least partially recharged using a lock shaft current generator.

6. The lock mechanism in claim 1, wherein said power supply is at least partially recharged using a magnetic current generator.

7. The lock mechanism in claim 1, wherein said power supply is at least partially recharged using a user activated current generator in which the user turns a motor to generate current.

8. The lock mechanism in claim 1, wherein said power supply is at least partially recharged using an activation system.

9. The lock mechanism in claim 1, wherein said power supply includes at least a solar cell.

10. The lock mechanism in claim 1 further comprising a user interface to the power supply, wherein the user interface includes at least a lever that causes a motor to turn and generate power in the form of a current.

11. The lock mechanism in claim 1, further comprising a user interface to the power supply, wherein the user interface includes at least a button that causes a motor to turn and generate power in the form of a current.

12. The lock mechanism of claim 1, wherein
    the lock shaft includes at least a cavity, and
    the lock cylinder is movable such that the lock cylinder can engage the lock shaft via the cavity to therein hold the lock shaft in a particular position when the lock cylinder engages the lock shaft.

13. The lock mechanism of claim 1, wherein
    the lock shaft is capable of sliding within a lock casing,
    the lock shaft includes at least a permanent magnet; and
    the lock casing has a wire wrapped around the lock casing for generating a current caused by movement of the permanent magnet within the lock casing.

14. The lock mechanism of claim 1, the lock shaft having a straight portion and an arced portion.

15. A lock mechanism, comprising:
    (A) a lock shaft,
    (B) a motor,
    (C) a lock cylinder, and
    (D) a power supply, further comprising:
    a nut having threading within which the lock cylinder moves; and
    a threading on the lock cylinder, the threading on the lock cylinder encases the threading of the nut, such that rotation of the lock cylinder causes the lock cylinder to move inward or outward within the nut, further comprising:
    the lock cylinder having grooves, and
    a cog engaging the grooves, rotating a cog causes
       the lock cylinder to rotate with the cog, and
       the cog to slide within the grooves as the lock cylinder moves inward and outward within the nut.

16. The lock mechanism of claim 15, wherein the motor causes the rotation of the lock cylinder.

* * * * *